US006844374B2

(12) United States Patent
Jin et al.

(10) Patent No.: US 6,844,374 B2
(45) Date of Patent: Jan. 18, 2005

(54) ENHANCED SCRATCH RESISTANT COATINGS USING INORGANIC FILLERS

(75) Inventors: Pei Wen Jin, Cary, NC (US); Kimberly R. Benca, Clayton, NC (US); Ian C. Quarmby, Apex, NC (US); Thomas Kurpiewski, Erie, NC (US); Victor E. Ferrell, Fuquay-Varina, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/971,306

(22) Filed: Oct. 3, 2001

(65) Prior Publication Data

US 2003/0092789 A1 May 15, 2003

(51) Int. Cl.$^7$ .................................................. C08F 2/46
(52) U.S. Cl. ........................... 522/79; 522/81; 522/77; 522/71; 522/96; 522/90; 522/83; 522/104; 522/107; 522/100; 522/168; 522/170; 522/113; 522/120; 522/114; 522/121; 427/508; 427/487; 428/323; 428/325; 428/331; 428/409; 524/430; 524/437; 524/438; 524/492; 524/493; 524/914
(58) Field of Search .................... 524/430, 437, 524/438, 492, 493, 914; 522/90, 96, 71, 77, 79, 81, 83, 104, 107, 100, 168, 170, 113, 120, 114, 121; 428/331, 332, 323, 328, 329; 427/508, 487

(56) References Cited

U.S. PATENT DOCUMENTS

| | | | | |
|---|---|---|---|---|
| 4,457,766 A | * | 7/1984 | Caul ............................. 51/298 |
| 4,548,894 A | * | 10/1985 | Lynch et al. .............. 430/273.1 |
| 4,652,470 A | | 3/1987 | Schappert et al. |
| 4,719,146 A | | 1/1988 | Hohage et al. |
| 4,734,452 A | * | 3/1988 | Hashimoto et al. .......... 524/533 |
| 4,877,677 A | * | 10/1989 | Hirochi et al. ............... 428/216 |
| 4,978,702 A | * | 12/1990 | Yuyama et al. .............. 524/266 |
| 5,015,523 A | * | 5/1991 | Kawashima et al. ......... 428/336 |
| 5,104,929 A | * | 4/1992 | Bilkadi ........................ 524/847 |
| 5,188,876 A | * | 2/1993 | Hensel et al. .................. 428/76 |
| 5,492,769 A | * | 2/1996 | Pryor et al. .................. 428/552 |
| 5,599,576 A | * | 2/1997 | Opolski ....................... 427/2.3 |
| 5,639,546 A | * | 6/1997 | Bilkadi ........................ 428/331 |
| 5,763,048 A | * | 6/1998 | Takahashi .................... 428/147 |
| 5,800,904 A | * | 9/1998 | Hallman et al. ............. 428/156 |
| 5,830,937 A | * | 11/1998 | Shalov et al. ................ 524/297 |
| 5,843,576 A | * | 12/1998 | Rosenberry et al. ...... 428/423.1 |
| 5,853,809 A | | 12/1998 | Campbell et al. |
| 5,891,564 A | * | 4/1999 | Shultz et al. ................ 428/324 |
| 5,928,778 A | * | 7/1999 | Takahashi et al. ........... 428/323 |
| 5,997,894 A | | 12/1999 | Blum et al. |
| 6,040,044 A | * | 3/2000 | Takahashi et al. ........... 428/323 |
| 6,128,001 A | * | 10/2000 | Gonsalves et al. ........... 345/589 |
| 6,225,434 B1 | * | 5/2001 | Sadvary et al. ............ 427/407.1 |
| 6,228,433 B1 | * | 5/2001 | Witt ............................. 427/487 |
| 6,228,463 B1 | * | 5/2001 | Chen et al. .................. 428/160 |
| 6,291,078 B1 | * | 9/2001 | Chen et al. .................. 428/543 |
| 6,332,291 B1 | | 12/2001 | Flosbach et al. |
| 6,387,519 B1 | * | 5/2002 | Anderson et al. ............ 428/447 |
| 6,399,670 B1 | * | 6/2002 | MacQueen et al. ........... 522/64 |
| 6,399,689 B1 | | 6/2002 | Scarlette |
| 6,440,500 B1 | * | 8/2002 | Sigel et al. .................. 427/494 |

FOREIGN PATENT DOCUMENTS

| | | |
|---|---|---|
| EP | 235 914 A2 | 1/1987 |
| GB | 2 232 672 | 12/1990 |
| WO | WO 00/39042 | 7/2000 |

* cited by examiner

Primary Examiner—James J. Seidleck
Assistant Examiner—Sanza L. McClendon
(74) Attorney, Agent, or Firm—Miles B. Dearth

(57) ABSTRACT

The invention provides organic coatings with improved scratch resistance. More particularly, the present invention relates to the use of inorganic filler materials of a defined type and particle size which can be added to curable organic coatings to improve the scratch resistance of the coating without a negative impact on the physical and performance properties or application parameters of the original coating material.

26 Claims, No Drawings

ENHANCED SCRATCH RESISTANT COATINGS USING INORGANIC FILLERS

FIELD OF THE INVENTION

The present invention relates to organic coatings with improved scratch resistance. More particularly, the present invention relates to the use of inorganic filler materials of a defined type and particle size which can be added to organic coatings to improve the scratch resistance of the coating without a negative impact on the physical and performance properties or application parameters of the original coating material. The coatings have utility on materials such as wood, MDF, rigid plastics such as PVC, for flooring, decorative tiles, home furnishings such as cabinets, furniture, and paneling, and machinery, appliance, and equipment housings, to name a few advantageous uses.

BACKGROUND OF THE INVENTION

Organic coatings such as those made from radiation curable and thermoset polymers are known for use in applications where the appearance of the coating is fundamental to its overall function, such that scratches on or through the surface would render the coating unsuitable or undesirable for continued use. Scratches not only detract from the overall appearance, but also compromise the integrity of the substrate. Past approaches to scratch resistant coatings focused on the use of harder polymers. However, these harder polymers were a result of increased crosslink density and showed inherent negative properties with respect to shrinkage, adhesion, flexibility, and impact resistance.

U.S. Pat. No. 5,853,809 describes scratch resistant clearcoats containing surface reactive microparticles. The coating composition contains a film forming binder system containing a crosslinkable resin, colorless inorganic microparticles of about 1.0 to about 1000 nanometers having a functionality reactable with the crosslinkable resin, and a solvent system for the crosslinkable resin.

Some attempts have been made in the art to improve abrasion resistance but these efforts have not addressed the issue of scratch resistance. For example, WO 00/39042 describes a surface covering comprising at least one layer containing wear-resistant particles, such as aluminum oxide. The particle size of the wear-resistant particles is from about 10 microns to about 350 microns, and more preferably from about 20 microns to about 250 microns, and most preferably from about 30 microns to 200 microns. Wear resistance is determined by abrasion tests such as the Taber abrasion test and the effect of the particles in the surface coating is described as providing abrasion resistance. No differentiation with respect to scratch resistance is made.

Likewise, EP 235 914 describes coating compositions for producing a texture finish onto a substrate, the composition comprising an adhesion promoter for promoting adhesion to the substrate, a radiation-curable component and a texture modifying amount of microspheres substantially homogeneously dispersed therein. The microspheres can be glass and/or ceramic and/or polymeric materials. The incorporation of fine glass, ceramic or polymeric solid beads or hollow spheres into a suitable radiation-curable component which, on curing, sets to form a matrix holding the beads or spheres on the substrate, enables a textured appearance to be provided and an abrasion resistance comparable to prior art methods. The particle size of the microspheres is up to 120 microns and more particularly from 15 to 60 microns and advantageously about 30 microns.

Thus, there have been attempts to provide greater abrasion resistance without regard to the scratch resistance of the material. There also have been attempts to find organic coatings with scratch resistance that provide appropriate properties for a variety of uses. However, these attempts have required the use of harder polymers, reactive systems or texture-modifying systems. Thus, there is still a need in the art for organic coatings which provide improved scratch resistance without negatively impacting other physical properties of the coating such as color, flexibility, gloss, gloss retention, impact resistance, opacity, and stain resistance.

SUMMARY OF THE INVENTION

The present invention is directed to a scratch resistant, smooth surface coating made from cured compositions comprising one or more curable polymers, and an inorganic filler in an amount effective to enhance the scratch resistance of the coating, the filler selected from the group consisting of aluminum oxide, silicon dioxide, ceramic spheres, and mixtures thereof, wherein the inorganic filler has a $50^{th}$ percentile particle diameter (size) of from 3 to 9 microns. The coatings provided by these coating compositions do not have a discernible texture as applied to non-textured surfaces. The coatings are especially suited as transparent coatings applied on texture and non-textured substrates.

In another aspect of the invention, a process for improving the scratch resistance of a radiation curable coating is provided comprising incorporating aluminum oxide, silicon dioxide, ceramic spheres and mixtures thereof having a particle size of about 3 to about 9 microns in a radiation curable coating composition, applying the coating composition to a substrate and curing the coating composition. The coating obtained upon curing the coating composition has improved scratch resistance over that typically found in radiation curable coatings. The coating preferably exhibits slight or substantially no scratches when exposed to rubbing with steel wool.

In a further aspect of the invention, a method for producing scratch resistant flooring is provided. This method comprises applying to a flooring substrate a coating composition comprising one or more radiation curable polymers, and an inorganic filler in an amount effective to enhance the scratch resistance of the flooring, wherein the inorganic filler has a particle size of 3 to 9 microns and is selected from the group consisting of aluminum oxide, silicon dioxide, ceramic spheres and mixtures thereof; and curing the radiation curable polymers.

DETAILED DESCRIPTION OF THE INVENTION

The coating compositions and methods of the present invention generally will utilize organic polymer materials known to those in the coating arts as radiation curable polymers. The type of polymers used in the coating compositions will depend on the ultimate use proposed for that formulation. Radiation curable coatings, such as UV curable coatings are used extensively in a variety of fields such as the manufacture of high performance commercial and residential vinyl flooring products. These coatings may be applied to the surface of the product to provide enhanced performance characteristics. The ability to provide a coating with improved scratch resistance is highly desirable. It has now been discovered that certain inorganic filler materials in particular diameter sizes incorporated into curable polymer fluids cure into scratch resistant coatings. The surprising effect of these types of inorganic fillers is that they provide steel wool scratch resistance without negatively impacting the coating appearance, performance properties, and application parameters of the curable polymer systems. In these systems steel wool scratch resistance is independent of the film thickness.

As used herein, "scratch resistance" is the ability of a coating to resist permanent scratching by sharp, angular, or otherwise similarly constructed objects drawn across the surface under either a constant or progressive load. Scratch resistance is distinguished from abrasion resistance. Abrasion relates to the resistance to removal of coating material. Scratching is characterized by the tendency to form single or multiple linear cuts or depressions that penetrate and fracture or deform the coating, causing permanent surface defects that are undesirable either from a point of functionality or aesthetics. Scratch resistance may be measured for example, by utilizing either a Teledyne Shear/Scratch tester with a stylus such as a diamond-tipped stylus. However experience has shown that the Teledyne test results can be skewed depending on the flexibility of the substrate, especially when the coating is applied to a resilient substrate. A test based on hand application of a steel wool abrasive pad is a measure of scratch resistance that is not influenced by the substrate. The steel wool test is accomplished by applying moderate downward pressure by hand to a #00 steel wool pad while moving the pad back and forth across the coating surface for a minimum of 5 cycles, a cycle being one forward and backward motion. Evaluation of the test area for scratch resistance is made by observation with the naked eye and/or with the aid of a 40-power magnifying device. A qualitative rating system assigns a 0-rating, a 1-rating or a 2-rating, where 0 represents no visible scratch or a barely discernible scratch, a rating of 2 is representative that scratches are prominent on the surface and visible by the naked eye up to several meters away and is considered unacceptable, and a rating of 1 is representative of an acceptable surface with scratches that can be seen but are not prominent when viewed from a distance of up to several meters.

"Abrasion resistance" is the ability of a coating to resist wearing away when subjected to rubbing, scraping, erosion, or the combined effects of all. The consequences of poor abrasion resistance are characterized by partial or complete removal of the coating in the abraded area. This partial or complete removal of the coating produces undesirable changes in performance properties and in physical appearance, i.e. gloss, color, etc.

"Radiation curable" means compositions composed of various reactive components which cure by polymerization through free radical or ionic mechanisms with the use of radiation whether of the UV or EB type. Moisture curable and thermoset systems are excluded from radiation curable compositions.

"Moisture curable" polymers refer to the well-known polymers capped with isocyanate groups which undergo curing in the presence of water. The moisture cure system evaluated in TABLE VII is typical and is an aromatic prepolymer of toluene diisocyanate (35% solids by weight in organic solvents).

"Polyurethane dispersions" refer to well known aqueous products comprising isocyanate polymers that typically are carboxylated and chain-extended with diamine. These dispersions coalesce when dried, develop film properties on application of heat and can be crosslinked using external crosslinking agents reactive with carboxyl functionality.

"Two component cure polyurethanes" refer to the well-known class of coating materials that comprise on one side, a polyol and on the other side an isocyanate. The embodiment illustrated in TABLE VIII is a polyester polyol co-reacted with an aliphatic polyisocyanate resin based on hexamethylene diisocyanate (HDI), as 65% solids in solvent.

"Cationic UV curable polymers" are well known polymeric materials characterized by the presence of oxirane functionality, and which are curable through a cationic induced polymerization mechanism. Suitable diluents include cycloaliphatic epoxy monomers, or oligomers, and vinyl ether monomers. UV curable cationic photoinitiators that are suitable are the various sulfonium or iodonium initiators. A typical curable cationic epoxide coating is a mixture of 3,4-epoxy cyclohexylmethyl3,4-epoxy cyclohexyl carboxylate, vinylcyclohexene monoxide, 3-ethyl-3-(hydroxymethyl) oxetane, and mixed triarylsulfonium hexafluorophosphate salts as the UV photoinitiator.

"Effective to enhance the scratch resistance of a coating" means that the amount of particles of the type and size specified used will result in the coating having improved scratch resistance as compared to a coating composition without any particles of the type and size specified, as measured by the use of a steel wool scratch test.

A coating that has a smooth, glossy surface means that the coating itself has no discernible texture seen with the naked eye, and the smoothness is sufficient so that an untextured (flat) coating exhibits gloss of at least 70 using a conventional gloss meter at 60° incident angle of light. Such smooth gloss coatings according to the invention can be coated on textured or untextured substrate surfaces, and can have a gloss that can be reduced by the use of a gloss-controlling agent.

It has now been discovered that by careful selection of types of particles and sizes of particles used as the inorganic filler material in a curable polymeric coating compositions, scratch resistance in such compositions can be improved over that previously known in the art.

The inorganic filler materials useful in the coating compositions of the invention that are of particular types that produce scratch resistant coatings and are defined as non-metallic materials that are typically crystalline in nature and selected from aluminum oxide, silicon dioxide, ceramic spheres or mixtures thereof. "Aluminum oxide" as used herein may include any aluminum oxide including $Al_2O_3$ products having up to 1% impurities. In a further aspect of the invention, the aluminum oxide may preferably include but is not limited to native alumina, found as the mineral carborundum and refined by the Bayer process to remove impurities and produce a nominal 99.5% $Al_2O_3$ product. The aluminum oxide may be any of the commercially available alumina products. The aluminum oxide particles found to provide improved scratch resistance have a $50^{th}$ percentile particle diameter (size) of from 4 to 9 microns.

Also to be included in the definition of inorganic fillers for scratch resistant coatings are inorganic fillers that are ceramic spheres of which those naturally occurring or synthetically produced such that the composition may be from about 50 to about 99% by weight silicon dioxide and 0 to about 30% aluminum oxide, as the key components, and contain sodium oxide from 0 to about 11%, potassium oxide from 0 to about 6%, carbon from 0 to about 3% and/or calcium oxide, ferric oxide, magnesium oxide, titanium oxide, sulfur trioxide in quantities from 0 to about 2%.

The ceramic spheres preferably will be silica and alumina or alkali alumino silicate ceramic. Such products can be obtained commercially including 3M® Zeeospheres® ceramic microspheres. Especially preferred ceramic spheres are those identified by 3M® as G-200, W-210, and W-410. The 50th percentile particle size should be 3 to 9 microns.

A third group of useful inorganic filler materials is silicon dioxide spheres or particles. These typically have a composition of from about 50 to about 99% by weight silicon dioxide and 0 to about 30% aluminum oxide, as the key components, and contain sodium oxide from 0 to about 11%, potassium oxide from 0 to about 6%, carbon from 0 to about 3% and/or calcium oxide, ferric oxide, magnesium oxide, titanium oxide, sulfur trioxide in quantities from 0 to about 2%. The silicon dioxide material may be any of the commercially available products meeting the requirements set forth herein. One preferred silicon dioxide material has a composition of about 99% silicon dioxide. This material occurs naturally in globular balls and is process treated with high purity heat and sold commercially as Goresil®. The particle size of the silicon dioxide that provides improved scratch resistance will be a $50^{th}$ percentile diameter of 3 to 9 microns and preferably about 4 to 9 microns.

The inorganic filler material useful in this invention preferably will be selected from aluminum oxide, silicon dioxide, ceramic spheres or mixtures thereof having a critical particle size range where it has been discovered that these filler materials, when provided as taught herein, give enhanced steel wool scratch resistance to a variety of curable coating materials. It has also been discovered that other inorganic filler materials do not provide this effect. For example, hollow borosilicate glass spheres, although similar in particle size and high in $SiO_2$ content, do not provide steel wool scratch resistance for UV curable polymer systems. Other inorganic particles having sufficient hardness and similar particle size to produce scratch resistant coatings may be undesirable for use in clear topcoats for flooring. This is particularly true of high opacity or high tint strength materials as they impart a high degree of color that is a negative attribute. Nylon particles are available in the range of particle sizes where scratch resistance is normally exhibited by the inorganic filler materials of the invention, but the nylon spheres do not contribute to improving steel wool scratch resistance.

It has also been found that synthetic amorphous silicas (fumed and precipitated), in the 3–9 micron $50^{th}$ percentile particle diameter size range do not provide improved steel wool scratch resistance. Synthetic amorphous silicas differ structurally from the above-mentioned examples of silicon dioxide spheres or particles. The amorphous silicas have porous structures with high surface areas and as such have very high oil absorptions. This characteristic feature of amorphous silicas is used to generate matte surfaces, and also in the Theological modification of coatings. Typical use levels range of from 1 to 8 wt. %. Known products that fall within this classification are Acematt® TS 100 and Acematt OK412 from Degussa, MIN-U-SIL® from US Silica, or Cabosil® H5 from Cabot Industries.

Generally, the inorganic filler material of the invention will be used in an amount sufficient to provide enhanced scratch resistance to the coating. This amount generally will be about 8 to about 50% by weight of the total coating composition, with the preferable amount being about 8 to about 12% by weight of the total composition. While the preferable amount of the inorganic particles in a typical formulation is 8 to 12% by weight, amounts up to and greater than 25% also exhibit excellent scratch resistant properties. The effects of higher levels of inorganic particles incorporated beyond 25% by weight are, increased viscosity of the coating prior to application, incidence of unwanted coating texture, and detrimental effect on physical properties and including an increased tendency for producing white marks when the coating is gouged. Inorganic particles incorporated at a level less than 8% by weight fail to achieve the improved scratch resistance. It has been discovered that use of inorganic filler material as taught herein such as silicon dioxide, aluminum oxide or ceramic spheres, in the amount indicated and with the particle size of 3 to 9 microns dispersed in radiation curable polymer coating compositions enables a unexpected improvement in scratch resistance over previously known coatings. Although any of these materials may be used, ceramic spheres are preferred because of their better performance and tendency to be less prone to settling in the coating upon extended storage.

The radiation curable coating compositions comprise radiation curable polymers and/or polymer compositions composed of one or more reactive components which cure by polymerization through free radical or ionic mechanisms. Typically, the radiation curable polymer is present in an amount of about 12 to about 90 percent by weight of the total coating composition. Each component of the radiation curable coating composition is designed to perform a specific function in both the uncured composition and the cured film. The components generally include (1) a reactive low-to-medium weight polymer, typically referred to as an oligomer, which imparts primary performance characteristics to the cured film; (2) monofunctional and polyfunctional reactive monomers which can contribute to the degree of crosslinking required in the cured film and otherwise function as reactive diluent to adjust the viscosity of the formulation to a level suitable for application; and (3) various non-reactive, specialty components such as filler, colorants, slip agents and release agents, which are added for various end-use properties.

In general, the radiation curable coating compositions of the invention will typically include an oligomer, a blend of functional monomers, inorganic filler as taught herein, and additional agents such as synthetic waxes, matting agents, and additives. The oligomer typically may be any oligomer known to be useful in radiation curable compositions. Reactive oligomers which are preferentially employed in the energy-curable compositions of this invention include substantially any polymeric material characterized by the presence of at least one, preferably at least two, ethylenically unsaturated unit(s), and which is curable through a free radical-induced polymerization mechanism. Suitable oligomers include the known acrylourethane oligomers, polyester acrylate oligomers, epoxy acrylate oligomers, or silicone acrylate oligomers commercially available. In a preferred aspect of the invention, the oligomer is an acrylourethane oligomer.

The oligomer typically comprises from about 10 to about 90, preferably from about 30 to about 50, percent by weight of the total radiation curable coating composition.

In the preparation of a radiation-curable coating composition, the oligomer is typically utilized in combination with a reactive monomer diluent system and in some instances a photoinitiator. Reactive monomers which can be used alone or in combination with reactive oligomers as reactive diluent for such oligomers in the practice of this invention are well known. Broadly, suitable reactive monomer diluent systems comprise at least one unsaturated addition polymerizable monomer which is copolymerizable with the oligomer upon exposure to radiation.

The reactive monomer diluent can be monofunctional or polyfunctional, e.g. di- or tri-functional. A single polyfunctional diluent can be used, as can mixtures thereof; or a combination of one or more monofunctional reactive monomer diluents and one or more polyfunctional reactive monomer diluents can be used. Particularly preferred reactive monomer diluents are unsaturated addition-polymerizable monofunctional and polyfunctional acrylic monomers. Alkoxylated and non-alkoxylated acrylic monomers are useful reactive diluents and are well known. Preferred alkoxylated acrylic monomers contain from 2–14 alkoxy repeating units. Examples of such acrylic monomers include isobornyl acrylate, phenoxyethyl acrylate, isodecyl acrylate, hexyl acrylate, cyclohexyl acrylate, 2-ethylhexyl acrylate, octyl acrylate, nonyl acrylate, stearyl acrylate, 2-phenoxy acrylate, 2-methoxyethyl acrylate, lactone modified esters of acrylic and methacrylic acid, methyl methacrylate, butyl acrylate, isobutyl acrylate, methacrylamide, allyl acrylate, tetrahydrofuryl acrylate, n-hexyl methacrylate, 2-(2-ethoxyethoxy)ethyl acrylate, n-lauryl acrylate, 2-phenoxyethyl acrylate, glycidyl methacrylate, glycidyl acrylate, acrylated methylolmelamine, 2-(N,N-diethylamino)-ethyl acrylate, neopentyl glycol diacrylate, alkoxylated neopentyl glycol diacrylate, ethylene glycol diacrylate, hexylene glycol diacrylate, diethylene glycol diacrylate, dipropylene glycol diacrylate, tripropylene glycol diacrylate, tetraethylene glycol diacrylate, pentaerythritol di-, tri-, tetra-, or penta-acrylate, trimethylolpropane triacrylate, alkoxylated trimethylol-propane triacrylate which contains from 2 to 14 moles of either ethylene or propylene oxide, triethylene glycol diacrylate, tetraethylene glycol diacrylate, alkoxylated neopentyl glycol diacrylate having from 2 to 14 moles of ethoxy or propoxy units, polyethylene glycol diacrylate, 1,3-butylene glycol diacrylate, 1,4-butanediol diacrylate, 1,6-hexanediol diacrylate, polyethylene glycol diacrylate, combinations thereof, and any corresponding methacrylates, as well as mixtures of any of the above.

The reactive monomer diluent system typically comprises from about 10 to about 85%, preferably from about 15 to about 45%, most preferably from about 30 to about 45% by weight of the total radiation-curable coating composition.

The UV curable coating compositions contain a photoinitiator to allow for curing of the polymer material. However compositions without photoinitiators may be cured using electron beam radiation. The photoinitiator can be by any of the known photoinitiators such as benzophenone, benzoin, acetophenone, benzoin methyl ether, Michler's ketone, benzoin butyl ether, xanthone, thioxanthone, propiophenone, fluorenone, carbozole, diethyoxyacetophenone, 1-hydroxy-cyclohexyl phenyl ketone, the 2-, 3- and 4- methylacetophenones and methoxyacetophenones, the 2- and 3-chloroxanthones and chlorothioxanthones, 2-acetyl-4-methylphenyl acetate, 2,2'-dimethyoxy-2-phenylacetophenone, benzaldehyde, fluorene, anthraquinone, triphenylamine, 3- and 4-allyl-acetophenone, p-diacetylbenzene, 3-chloro-2-nonylxanthone, 2-chlorobenzophenone, 4-methoxybenzophenone, 2,2',4,4'-tetrachlorobenzophenone, 2-chloro-4'-methylbenzophenone, 4-chloro-4'-methylbenzophenone, 3-methylbenzophenone, 4-tert-butyl-benzophenone, isobutyl ether, benzoic acetate, benzil, benzilic acid, amino benzoate, methylene blue, 2,2-diethoxyacetophenone, 9,10-phenanthrenequinone, 2-methyl anthraquinone, 2-ethyl anthraquinone, 1-tert-butyl-anthraquinone, 1,4-naphthoquinone, isopropylthioxanthone, 2-chlorothioxanthone, 2-iso-propylthioxanthone, 2methylthioxanthone, 2-decylthioxanthone, 2-dodecyl-thioxanthone, 2-methyl-1-[4-(methyl thio)phenyl)]-2-morpholinopropanone-1, combinations thereof and the like.

The photoinitiator or combination of photoinitiators is typically utilized in an amount ranging from about 0.5 to about 15, preferably from about 1 to about 5 percent by weight of the radiation-curable coating composition.

The photoinitiator selected for use in a particular composition will depend on the coating composition and use of the coating. Preferably, the photoinitiator will be of the type found to be useful in curing polymers by exposure to ultraviolet light. Most preferably, the photoinitiator will allow for curing in air under standard mercury lamps such as those utilized in well known AETEK® UV processors available from Aetek UV Systems, Inc., Romeoville, Ill.

Optional components also may be present in the coating composition of the present invention such as additives to control rheology, gloss, improve surface wetting, promote adhesion, and to eliminate foaming. These additives include, for example, synthetic silicas and waxes, modified polysiloxanes, and other polymer additives known to those skilled in the art coatings formulation. The amount of optional component will depend on the purpose and type of the additive used and can be determined by one skilled in the art.

The coating compositions of the present invention are prepared by incorporation of the inorganic particles in to the coating with the aid of a high-speed disperser such as a Cowles® or Hockmeyer® mixer. The coating is dispersed until the inorganic particles are uniformly dispersed. One skilled in the art can determine when the proper degree of dispersion has been obtained. The composition may be cured by any means known to one skilled in the art. In one aspect of the invention, the composition is cured by exposure to ultraviolet light provided from a stand mercury lamp used in the AETEK® UV Processor.

The coating of the invention may be used on a variety of substrates but have been found particularly useful on substrates commonly used for paneling, cabinets and flooring, particularly those types of coatings which require scratch resistance and a glossy, non-textured coating. Synthetic substrates include a variety of polymeric substrates formed from well known polymers such as PVC, ABS, ASA, PS, HIPS, PC, PO, Acrylic, SMC and the like. The scratch resistant coating compositions of the invention preferably are utilized in the manufacture of resilient flooring, particularly polyvinyl chloride resilient flooring materials used in the production of plank, tiles and sheet vinyl. A resilient flooring as a substrate for the coatings can itself have an embossed texture or have no embossed textured, and typically has at least a resilient support layer, a wear surface and a topcoat over the wear surface. Resilient flooring may have additional layers present for providing additional wear resistance or for strengthening the flooring. The scratch resistant coating compositions of the invention are particularly useful as the topcoat of resilient flooring, preferably embossed or unembossed vinyl flooring.

In one particular aspect of the invention, a method is provided for producing scratch resistant flooring comprising applying to a substrate a coating composition comprising one or more radiation curable polymers, a photoinitiator, and an amount of inorganic filler effective to enhance the scratch resistance of the flooring, where the inorganic filler has a particle size of 3 to 9 microns and is selected from the group consisting of aluminum oxide, silicon dioxide, ceramic spheres and a mixture thereof; and curing the radiation curable polymers. Preferably, the substrate is a vinyl flooring material and is well known in the art.

The coating compositions of this invention can be applied and cured by any of the conventional known methods. Application of the coating can be by roll coating, curtain coating, airless spray, dipping or by any other procedure. The cure can be effected by exposure to a radiant energy source, which includes subsets such as actinic radiation, especially ultraviolet light radiation, and electron beam accelerators. The equipment utilized for curing, as well as the appropriate time for curing, and the conditions under which the curing is effected are well-known to those skilled in the art of radiation curing and do not require further elaboration herein.

In one aspect of the invention, a process for improving the scratch resistance of a radiation curable coating is provided. This process comprises incorporating one of the inorganic filler materials taught herein in a radiation curable coating composition, applying the coating composition to a substrate and polymerizing or curing the coating composition. The polymerizing or curing step results in a scratch resistant, smooth coating on the substrate which has no discernible coating texture.

Testing for scratch resistance of the formulations discussed herein was accomplished by applying moderate downward pressure to #0 and #00 steel wool pads while moving them back and forth across the coating for 5 or more cycles. Evaluation of the test area for scratch resistance was done by visual observation with the naked eye and under 40-power microscope.

The following examples are given to illustrate the invention and not to be construed to limit the scope of the invention.

EXAMPLE 1

Example 1 illustrates the Taber scratch resistance of UV curable coatings containing aluminum oxide. Photoglaze® U306, a commercially available UV coating from Lord Corporation, was used as the UV curable portion of the formulation. Aluminum oxide, of various particle sizes, was added to the U306 at different levels. The scratch resistance was tested using the Teledyne Taber Shear/Scratch Tester. The scratch resistance is defined as the weight applied to a diamond tipped stylus that causes a scratch in which dirt pick-up is observed. The coatings were applied at a film thickness of about 1 mil on Leneta® charts and laminated vinyl tile, cured in air at a conveyor speed of 65 ft/min. using one 200 and one 300 watt/inch lamp placed in series. The formulations and test results are in Table I.

TABLE I

Evaluation of Taber scratch using Aluminum Oxide

| Formulation | Lord U306 UV curable coating | A | B | C | D | E |
|---|---|---|---|---|---|---|
| Lord U306 UV curable coating | — | 70 | 60 | 70 | 60 | 55 |
| Micro Abrasives Micro Grit ® WCA Al$_2$O$_3$ 3 µm | — | 30 | 40 | | | |
| Micro Abrasives Micro Grit WCA Al$_2$O$_3$ 20 µm | — | | | | | 45 |
| Micro Abrasives Micro Grit WCA Al$_2$O$_3$ 30 µm | — | | | 30 | 40 | |

TABLE I-continued

Evaluation of Taber scratch using Aluminum Oxide

| Formulation | Lord U306 UV curable coating | A | B | C | D | E |
|---|---|---|---|---|---|---|
| Teledyne Taber Scratch Tester(g) | 200 | 275 | 225 | 200 | 225 | 200 |

EXAMPLE 2

Formulations were prepared as in Example 1, using ceramic spheres in place of aluminum oxide. Photoglaze® U306, a commercially available UV coating from Lord Corporation, was used as the UV curable portion of the formulation. The ceramic spheres used were 3M® white Zeeospheres® ceramic microspheres. These spheres are described in the literature as semi-transparent, white-colored microspheres of alkali aluminosilicate ceramic. The 50$^{th}$ percentile particle size of W-210 microspheres is 4 microns by volume. The 50$^{th}$ percentile particle size of W-410 microspheres is 4 microns, by volume. The coatings were applied at a film thickness of about 1 mil on laminated vinyl tile, cured in air at 65 ft/min. using one 200 and one 300 watt/inch lamp placed in series. The formulations and test results are set forth in Table II.

TABLE II

| Formulation | Lord U306 UV curable coating | A | B | C |
|---|---|---|---|---|
| Lord U306 UV curable coating | 100 | 75 | 75 | 72.5 |
| 3 M W-210 Ceramic Spheres | | 25 | | |
| 3 M W-410 Ceramic Spheres | | | 25 | |
| Silquest ® 1100 | | | | 2.5 |
| Teledyne Taber Scratch Tester/g | 250 | 375 | 275 | 300 |

EXAMPLE 3

A number of formulations were prepared as in Example 2, using ceramic spheres. The coatings were applied at a film thickness of about 1 mil on laminated vinyl tile, cured in air at 65 ft/min. using one 200 and one 300 watt/inch lamp placed in series. The formulations and test results are set forth in Table III.

TABLE III

| Formulation | Control | A | B | C | D | E |
|---|---|---|---|---|---|---|
| Lord U306 UV curable coating | 100 | 40 | | 40 | | |
| Lord U309 UV Curable coating | | | 40 | | 40 | 40 |
| 3M W-210 Ceramic Spheres | | | 60 | 30 | 60 | 60 |
| 3M W-410 | | 60 | | 30 | | |
| Ceramic Spheres Total | 100 | 100 | 100 | 100 | 100 | 100 |
| Teledyne Taber Scratch tester/g | 150 | 325 | 575 | 400 | 850 | 750 |

The coatings were applied at film thickness of 1 mil on laminated vinyl tile, cured in air at 65 ft/min. using one 200 and one 300 watt/inch lamp placed in series.

The following results illustrate scratch resistance to #00 steel wool. The concentration of inorganic particles was set at 12% by weight of the formulation.

EXAMPLE 4

This series evaluated inorganic fillers in coatings applied to laminated vinyl tile at 1 mil thickness and cured as in the previous examples. The results demonstrate that while aluminum oxide does provide scratch resistance, ceramic spheres provide higher performance with minimal effects on the application and physical properties of the coating. The Aluminum Oxides labeled Micro Grit® WCA and Micro Grit Silane treated $Al_2O_3$ are supplied by Micro Abrasives Corporation and described in the literature as white platelet particles each being an individual crystallite. The ceramic spheres labeled W-210, W420, W-610, G-800 and G-850, are 3M Zeeospheres® ceramic microspheres. The W-210, W420, and W-610 are described in the literature as semi-transparent, white-colored, fine particle size, high-strength microspheres. G-800 and G-850 are described in the literature as gray and made of silica-alumina ceramic. The $50^{th}$ percentile particle diameter ($D_{50}$) is listed by volume. The formulations and test results are set forth in Tables IVa and IVb.

TABLE IVa

| | $D_{50}$ (μm) | Amount (wt. %) | | | | |
|---|---|---|---|---|---|---|
| | | A | B | C | D | E |
| Lord U306 UV curable coating | | 88 | 88 | 88 | 88 | 88 |
| 3M W-210 Ceramic Spheres | 3 | 12 | | | | |
| 3M W-410 Ceramic Spheres | 4 | | 12 | | | |
| 3M W-610 Ceramic Spheres | 8 | | | 12 | | |
| 3M G-800 Ceramic Spheres | 21 | | | | 12 | |
| 3M G-850 Ceramic Spheres | 40 | | | | | 12 |
| #00 steel wool Scratch Rating | | 0 | 0 | 1 | 2 | 2 |

TABLE IVb

| Formulation | F | G | H | I | J | K |
|---|---|---|---|---|---|---|
| Lord U306 UV curable coating | 88 | 88 | 88 | 88 | 88 | 100 |
| Micro Abrasives Micro Grit WCA $Al_2O_3$ 3 μm | 12 | | | | | |
| Micro Abrasives Micro Grit WCA $Al_2O_3$ 9 μm | | 12 | | | | |
| Micro Abrasives Micro Grit WCA $Al_2O_3$ 20 μm | | | 12 | | | |
| Micro Abrasives Micro Grit Silane treated/$Al_2O_3$ 3 μm | | | | 12 | | |
| Micro Abrasives Micro Grit Silane treated/$Al_2O_3$ 15 μm | | | | | 12 | |
| #00 Steel wool scratch rating (avg. of 3) | 1 | 1 | 2 | 1 | 2 | 2 |

EXAMPLE 5

Evaluation of Curing Systems

Tables V through XI demonstrate the invention in both UV curable and non-UV curable coating systems. Other cure systems tested in this example are coatings cured by free radical, cationic cured, isocyanate moisture cure, two-component cure polyurethane, polyurethane dispersion, and water borne free radical curing polymers. The free radical and cationic cure polymers are commercially available from Sartomer and Dow (formerly Union Carbide) respectively. The isocyanate moisture cure and two-component cure polyurethane systems are available from Lord Corporation. The polyurethane dispersion and aqueous UV curable free radical systems are available from Neo Resins, Inc. and Alberdingk Boley, Inc., respectively.

TABLE IVa

TABLE V: UV Free Radical Cure System

| Ingredient | % By Weight | |
|---|---|---|
| Sartomer CN983 Aliphatic urethane diacrylate oligomer | 37.6 | 37.6 |
| Sartomer SR238 1,6 hexane diol diacrylate | 6.2 | 4.6 |
| Sartomer SR502- ethoxylated trimethylolpropane triacrylate | 41.0 | 35.7 |
| 3 M W-210 Ceramic Spheres | 12.1 | 18.0 |
| Photoinitiators and Wetting agents | 3.0 | 3.0 |
| Total | 100.0 | 100.00 |
| #00 Steel Wool Scratch rating | 0 | 0 |

TABLE VI

UV Cationic Cure System

| Ingredient | % By Weight | |
|---|---|---|
| Cyracure ® UVR 6110 Cycloaliphatic diepoxide | 50.16 | 46.72 |
| Cyracure UVR 6100 (86% UVR-6110, 14% vinylcyclohexene monoxide) | 22.00 | 20.49 |
| Cyracure UV1-6990 (mixed triarylsulfonium hexafluorophosphate salts) | 2.64 | 2.46 |
| Cyracure 6000 (3-ethyl, 3-(hydroxymethyl) oxetane) | 13.2 | 12.29 |
| Wetting agents | 0.04 | 0.04 |
| 3 M W-210 Ceramic Spheres | 12.00 | 18.00 |
| Total | 100.00 | 100.00 |
| #00 Steel Wool Scratch rating | 0 | 0 |

TABLE VII

Moisture Cured Isocyanate Systems

| Ingredient | Control | A | B | C | D |
|---|---|---|---|---|---|
| | % By Weight | | | | |
| Lord Chemglaze ® Z016 | 100 | 88 | 82 | 75 | 50 |
| 3M W-210 Ceramic Spheres | — | 12 | 18 | 25 | 50 |
| Total | 100 | 100 | 100 | 100 | 100 |
| #00 Steel Wool Scratch rating | 2 | 2 | 2 | 2 | 2 |

TABLE VIII

Two-Component Cure Polyurethane Systems

| Ingredient | Control | A | B | C | D |
|---|---|---|---|---|---|
| | % by Weight | | | | |
| Lord Chemglaze ® 4103 A/B | 100 | 88 | 82 | 75 | 50 |
| 3M W-210 | — | 12 | 18 | 25 | 50 |
| Ceramic Spheres Total | 100 | 100 | 100 | 100 | 100 |
| #00 Steel Wool Scratch rating | 2 | 1 | 0 | 0 | 0 |

TABLE IX

Polyurethane Dispersion

| Formulation | Control | A | B | C | D |
|---|---|---|---|---|---|
| | % by weight | | | | |
| NeoRez ® 974 Polyurethane Dispersion | 100 | 94 | 90 | 85 | 67 |
| 3M W-210 Ceramic Spheres | 0 | 6 | 10. | 15 | 33 |
| % 3M W-210 on Solids | 0 | 12 | 18 | 25 | 50 |
| #00 Steel wool scratch rating | 2 | 2 | 1 | 1 | 1 |

TABLE X

Aqueous UV Curable Free Radical system

| Formulation | Control | A | B | C | D |
|---|---|---|---|---|---|
| | % by weight | | | | |
| Lux 338 VP Aqueous UV Curable Polymer | 100 | 95 | 92 | 88 | 71 |
| 3M W-210 Ceramic Spheres | | 5 | 8 | 12 | 29 |
| % 3M W-210 on Solids | | 12 | 18 | 25 | 50 |
| #00 Steel wool scratch rating | 2 | 1 | 1 | 1 | 1 |

The UV curable aliphatic urethane diacrylate oligomer, available from Sartomer was diluted with 1,6-hexanediol diacrylate and ethoxylated trimethylolpropane triacrylate monomers. The Polyurethane dispersion is an anionic aliphatic polyester dispersion 45% by weight in water with N-methyl-2 pyrrolidone and triethylamine for stabilization. The aqueous UV cure system evaluated is a blend of an aliphatic polyester polyurethane (25%) and acrylic acid ester copolymer (75%) 40% by weight in water. Each system was evaluated with various percentages by weight of W-210 ceramic spheres. The radiation cure systems were applied at a film thickness of 25 microns, and cured with 760 mJ/cm² UV energy. The resulting coating exhibited excellent steel wool scratch resistance. The aqueous UV curable system exhibited slightly less steel wool scratch resistance compared to the 100% solids UV curable cure systems. On the other hand the moisture cure system also applied at 25 microns did not perform as well and did scratch when tested by the same methods applied to the radiation cure systems. The moisture cure embodiment took 7 days to reach fully cured film properties.

EXAMPLE 6

Evaluation of Other Inorganic Particles for Steel Wool Scratch

The examples below illustrate the effects of borosilicate glass spheres and silicone dioxide particles alone and in combination with nylon particles.

TABLE XIa

| Ingredient | Particle Size | % By Weight | | | | | |
|---|---|---|---|---|---|---|---|
| Lord U306 UV curable coating | | 88 | 82 | 88 | 70 | 88 | 82 |
| Goresil 525 | 5 μm | 12 | 18 | | | | |
| Goresil 825 | 8 μm | | | 12 | 30 | | |
| Sphericel Borosilicate Glass Spheres | 11.7 μm | | | | | 12 | 18 |
| Total | | 100 | 100 | 100 | 100 | 100 | 100 |
| Steel Wool Scratch rating | | 1 | 1 | 1 | 1 | 2 | 2 |

TABLE XIb

Other Inorganic Fillers for Evaluation of Scratch Resistance

| Ingredient | % By Weight | |
|---|---|---|
| Lord U 309 UV curable coating | 90.00 | 73.00 |
| 60 μm nylon | 5.00 | 5.00 |
| Sartomer SR 306 | 5.0 | 10.00 |
| 3 M W-210 Ceramic Spheres | | 12.00 |
| Total | 100.00 | 100.00 |
| #00 Steel Wool Scratch rating | 2 | 0 |

The testing of additional sizes and types of inorganic particles indicates that for the most part the other particles tested which were within the size range of 3–9 microns are effective in producing steel wool scratch resistant coatings. Two grades of Goresil® silicon dioxide particles were evaluated and produced results that were very good, but slightly less effective than the W-210 ceramic spheres. The mean particle sizes of the two grades are 5 and 8 microns. Goresil® silicon dioxide particles are a form of Cristobalite silica, are translucent particles with a composition of 99% silicon dioxide that occur naturally as globular balls and undergo a final process treated with high purity heat. Goresil® silicon dioxide particles are available from C.E.D. Processed Minerals Inc Sphericel® hollow glass spheres (supplied by Potters, a division of PQ corporation) are borosilicate glass ($SiO_2$–81%, $B_2O_3$, –13%, $Na_2O+K_2O$–4%, $Al_2O_3$–2%). Sphericel glass microspheres have a mean diameter of 11.7μ. They are noted for their mechanical and thermal stability, but failed to provide steel wool scratch resistance when formulated and applied in the same manner as the ceramic spheres or the Goresil spheres. Previous testing of nylon spheres in the 10–12 micron particle size range also failed to show any positive attributes for steel wool scratch, as was the case with the 60-micron nylon spheres. When used in combination with ceramic spheres the scratch resistance of the coating was improved (see Table IXb) but by no more than that observed when the ceramic spheres were incorporated by themselves. Incorporation of the nylon spheres is known to improve the abrasion resistance of the coating and is confirmed when tested by measuring the coating weight loss after abrasion with Taber abrasive wheels, however this demonstration makes clear that a material may enhance abrasion resistance without improving scratch resistance.

EXAMPLE 7
Evaluation of The Effect of Film Thickness on Steel Wool Scratch Resistance

TABLE XII

| Film Thickness Evaluation | | | | |
|---|---|---|---|---|
| Ingredient | | Dry Film Thickness | | |
| Coating from Example 4A | 25 microns | 50 microns | 75 microns | 150 microns |
| Steel Wool Scratch rating | 0 | 0 | 0 | 0 |

Application of acrylourethane to Leneta charts at increasing film thickness shows that as film thickness increases there in no change in steel wool scratch resistance and is believed to be aided by the relatively fast cure of the UV cure system.

While the invention has been described in detail and with reference to specific embodiments thereof, it will be apparent to one skilled in the art that various changes and modifications can be made without departing from the spirit and scope thereof.

We claim:

1. A scratch resistant coating composition having no discernible texture upon curing when applied to a non-textured substrate, said composition comprising: one or more radiation curable monomers, oligomers or polymers or a combination thereof, a photoinitiator, and an amount of ceramic spheres effective to enhance the scratch resistance of the coating composition after cure, wherein the ceramic spheres have a $50^{th}$ percentile particle diameter of from 3 to 9 micros.

2. A process for improving the scratch resistance of a radiation curable coating composition comprising:
   incorporating ceramic spheres having a $50^{th}$ percentile particle diameter of 3 to 9 microns in a radiation curable coating composition;
   applying the coating composition to a substrate; and
   curing the coating composition forming a glossy coating, with no discernible texture on the coating surface.

3. The coating composition of claim 1, wherein said curable polymer contains an alkoxylated di- or tri-acrylate.

4. The coating composition of claim 1 wherein said curable polymer is an acrylourethane and contains a non-alkoxylated acrylate selected from the group consisting of tripropylene glycol diacrylate, neopentylglycol diacrylate, trimethylolpropane triacrylate, 1,6-hexane diol diacrylate, 2-ethylhexyl acrylate, isobornyl acrylate, phenoxyethyl acrylate and isodecyl acrylate.

5. The coating composition of claim 1 wherein the $50^{th}$ percentile particle diameter is 3 microns.

6. The coating composition of claim 1 wherein the $50^{th}$ percentile particle diameter is 4 microns.

7. The coating composition of claim 1 wherein the $50^{th}$ percentile particle diameter is 5 microns.

8. The coating composition of claim 1 wherein the $50^{th}$ percentile particle diameter is 8 microns.

9. The coating composition of claim 1 wherein the coating composition comprises from about 8 to about 25 weight percent of said ceramic spheres.

10. The coating composition of claim 9 wherein the coating composition comprises from about 8 to about 12 weight percent of said ceramic spheres.

11. The coating composition of claim 9 wherein the curable oligomer is present in an amount of about 10 to about 85 percent by weight of the total radiation curable coating composition, and wherein a monofunctional or polyfunctional reactive monomer is present in an amount of from about 10 to about 85 percent by weight of the total coating composition.

12. The coating composition of claim 10 wherein the curable oligomer is present in an amount of about 10 to about 85 percent by weight of the total radiation curable coating composition, and wherein a monofunctional or polyfunctional reactive monomer is present in an amount of from about 10 to about 85 percent by weight of the total coating composition.

13. The coating composition of claim 9 wherein said curable polymer is an acrylourethane and contains a non-alkoxylated acrylate selected from the group consisting of tripropylene glycol diacrylate, neopentylglycol diacrylate, trimethylolpropane triacrylate, 1,6-hexane diol diacrylate, 2-ethylhexyl acrylate, isobornyl acrylate, phenoxyethyl acrylate and isodecyl acrylate.

14. The coating composition of claim 10 wherein said curable polymer is an acrylourethane and contains a non-alkoxylated acrylate selected from the group consisting of tripropylene glycol diacrylate, neopentylglycol diacrylate, trimethylolpropane triacrylate, 1,6-hexane diol diacrylate, 2-ethylhexyl acrylate, isobornyl acrylate, phenoxyethyl acrylate and isodecyl acrylate.

15. The coating composition of claim 9 wherein said composition is cured.

16. The coating composition of claim 10 wherein said composition is cured.

17. The coating composition of claim 9 wherein said ceramic spheres have a $50^{th}$ percentile particle size from 4 to 8 microns.

18. The coating composition of claim 10 wherein said ceramic spheres have a $50^{th}$ percentile particle size from 4 to 8 microns.

19. The coating composition of claim 2 wherein the coating composition comprises from about 8 to about 25 weight percent of said ceramic spheres.

20. A method for producing scratch resistant flooring comprising: applying a top coating on said flooring, said topcoat comprising one or more radiation curable monomers, oligomers or polymers or a combination thereof, a photoinitiator, and ceramic spheres in an amount effective to enhance the scratch resistance of the top coating after cure, wherein said ceramic spheres have a $50^{th}$ percentile particle size of from 3 to 9 microns and curing the radiation curable polymers to form a smooth coating surface.

21. The method of claim 20 wherein the substrata is an embossed flooring material.

22. The method of claim 21 wherein the flooring material comprises polyvinyl chloride.

23. The method of claim 22 wherein the flooring material has a resilient support layer and a wear surface layer.

24. The method of claim 22 wherein the inorganic filler material has a $50^{th}$ percentile particle size of 4 microns.

25. The method of claim 20 wherein the radiation curable polymer is cured with ultraviolet light radiation.

26. The method of claim 21 wherein the radiation curable polymer comprises an acrylourethane polymer.

* * * * *